United States Patent [19]
Zabler

[11] 4,132,980
[45] Jan. 2, 1979

[54] HIGH-SENSITIVITY INDUCTIVE TRANSDUCER FOR RECTILINEAR OR ROTATIONAL DISPLACEMENT

[75] Inventor: Erich Zabler, Karlsruhe, Germany

[73] Assignee: Robert Bosch GmbH, Stuttgart, Germany

[21] Appl. No.: 671,993

[22] Filed: Mar. 30, 1976

[30] Foreign Application Priority Data

Apr. 8, 1975 [DE] Fed. Rep. of Germany ....... 2515257

[51] Int. Cl.$^2$ .............................................. G08C 19/06
[52] U.S. Cl. .................................... 340/195; 324/208; 336/75; 336/79; 340/199
[58] Field of Search ...................... 340/195, 196, 199; 323/51; 336/212, 216, 75, 79; 324/34 D

[56] References Cited

U.S. PATENT DOCUMENTS

| | | | |
|---|---|---|---|
| 1,028,851 | 6/1912 | Bard | 340/199 |
| 3,205,485 | 9/1965 | Noltingk | 340/196 |
| 3,820,094 | 6/1974 | Mouri et al. | 340/199 |
| 3,973,191 | 8/1976 | Zabler | 324/34 D |
| 4,013,986 | 3/1977 | Weckenmann | 336/75 |

Primary Examiner—John W. Caldwell, Sr.
Assistant Examiner—James J. Groody
Attorney, Agent, or Firm—Flynn & Frishauf

[57] ABSTRACT

A core with at least three elongated legs, at least one leg being centrally located among all the elongated legs, is joined at at least one end by a yoke portion connecting all the legs. The central leg or legs is wound with a magnet winding close to the yoke portion of the core, with which the core is excited with an alternating field. A short-circuiting ring structure, which may be in the form of an apertured plate, encircles at least the central leg or legs of the core and is movable in the direction of elongation of the core in accordance with the movement of a body the displacement of which is to be measured. The legs of the core may be bent in order to measure rotational or angular displacement. Movement of the short-circuiting ring along the length of the core varies the inductance of the coil in a predetermined manner, which may be a linear relation to displacement. A yoke and a winding may be provided at the other end in order to increase the sensitivity by a differential method of measurement.

4 Claims, 9 Drawing Figures

← TO MOVABLE BODY OF WHICH LINEAR DISPLACEMENT IS TO BE MEASURED

HIGH-SENSITIVITY INDUCTIVE TRANSDUCER FOR RECTILINEAR OR ROTATIONAL DISPLACEMENT

This invention relates to an inductive transducer for converting a mechanical movement into an analog or digital electrical magnitude, particularly an electric potential, that depends in a predetermined way on the displacement of the object the movement of which is to be measured, in particular a electric potential that is a linear function of such displacement, whether the displacement itself is linear or angular. In particular, the invention relates to transducers having a magnetic winding provided on a ferromagnetic core having a plurality of legs extending away from the place where the magnetic winding is located and a short-circuiting ring encircling some or all of the legs and mechanically connected to the body the movement of which is to be measured, the inductance of the winding thus being caused to vary with the movement of the short-circuiting ring.

The solenoid transducer is an inductive transducer that has been known for a long time. In that device a freely movable ferromagnetic core is made to move in and out of a coil, as the result of which the inductance L of the coil is variable. Since the relation between the displacement of the core and the inductance is not linear in this case, linearizing the transducer can be accomplished only by electronic circuits of relatively great expense. The sensitivity of such a device is small. Furthermore, the solenoid transducer has a great physical length compared to the useable working displacement range. A further disadvantage is the relatively great mass of the ferromagnetic core and the occurrence of indication errors as the result of acceleration forces operating in the direction of measurement.

An improved type of inductive transducer is disclosed in U.S. Pat. application Ser. No. 491,180 of Albert Weckenmann, filed July 23, 1974, and owned by the assignee of the present application, now U.S. Pat. No. 4,013,986, issued Mar. 22, 1977 wherein an inductive transducer is shown having an elongated core composed of two elongated members joined at one or both ends by a transverse portion and separated by an elongated gap, a winding being provided on a transverse end portion of the core and a short-circuiting ring movable in the direction of elongation of the elongated members being provided that comprises a short-circuit encircling each of the elongated members.

It is an object of this invention to provide an inductive transducer with substantially improved characteristics, particularly greater sensitivity than the inductive transducer just described. In particular, it is an object of this invention to provide an inductive transducer that overcomes the disadvantages of the solenoid type of transducer to a greater degree than heretofore accomplished and to do so with movable parts that are of the smallest possible mass in order to be well-suited for dynamic measurements. Furthermore, the inductive transducer should be as simple and cheap to build as possible, both in mechanical and electronic respects, in order to be suitable for mass-production and the device should be both of great sensitivity and also suitable for measurement of relatively large displacements.

SUMMARY OF THE INVENTION

Briefly, the core is provided with at least three legs, which may be straight or curved, with at least one leg being more or less centrally located with respect to the others, all the legs being connected by a yoke portion. A magnet winding is provided adjacent the yoke portion, preferably around the centrally located leg and a short-circuiting ring member, preferably in the form of an apertured plate perpendicular to the elongation direction of the legs is connected to the movable the displacement of which is to be measured and is mounted movably in the direction of elongation of the legs, and it is constituted to provide a short-circuiting ring at least for one or more legs of the core centrally located among the core legs.

According to one form of the invention, the core is of E shape and the short-circuiting member provides a short-circuiting ring encircling each of the legs of the core. An embodiment of the invention in this form increases the sensitivity of the inductive transducer by a factor of at least two compared to a similar inductive transducer having a U-shaped core, as for example those described in the previously mentioned patent application Ser. No. 491,180. In a particular form of an inductive transducer with an E-shaped core, the E-shaped core is composed of two U-shaped cores in contact along respective longitudinal surfaces of one leg of each core. In still another useful embodiment of the invention, an inductive transducer has a core made up of four U-shaped cores arranged with four legs, one of each U-shaped core in a central close packed cluster which is encircled by the movable short-circuiting plate or ring and the U formed by each core is intersected by the short-circuiting ring at spacings of substantially 90° one from the other.

It is also practical to utilize a form of the invention utilizing an E-shaped core in which the short-circuiting plate or ring encircles the middle leg of the core without encircling the outer legs.

For the measurement of angular displacement (rotation), the legs of an E-shaped core may be bent around in a circle, either in the same plane or on a cylindrical median surface and the short-circuiting plate or ring may be pivoted on an axis central of and perpendicular to the circle or coaxial with the cylinder, as the case may be.

The three or more legs of the core may be joined by a yoke at both ends and a magnet winding may be put around the centrally located leg or legs at both ends thereof, so that the movement of the short-circuiting ring will have a differential effect on the inductance of the respective coils, so that sensitivity of the device may again be doubled, with the use of a circuit responsive to inductance difference. This arrangement provides for a null position that is independent of temperature effects and the like.

The invention is further described by way of example with reference to the accompanying drawings, in which.

Figure 1:
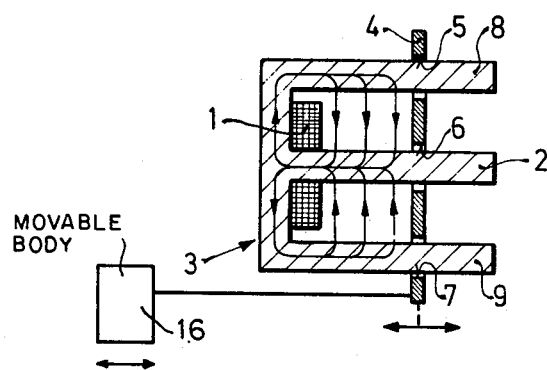
FIG. 1 is a longitudinal cross-section of a first embodiment of an inductive transducer according to the invention.
Figure 2:
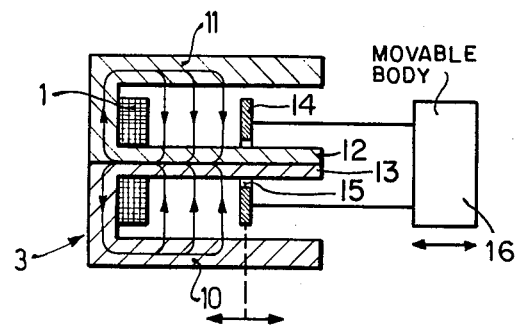
FIG. 2 is a second embodiment of the invention similar to the embodiment of FIG. 1.

In the embodiments of the invention shown in FIGS. 1 and 2, a magnet winding 1 is provided around the route of the center leg of an E-shaped ferromagnetic core in order to produce a variable inductance in cooperation with a short-circuiting ring member in the form of an apertured thin plate. In FIG. 1, the short-circuiting ring member 4 is provided with apertures 5, 6 and 7 through which the respective legs 2, 8 and 9 of the E-shaped core pass. The ring member 4 is freely movable in the longitudinal direction of the core legs, as symbolized by the double arrow at the bottom of the figure. It is symbolically shown connected to a movable object 16, of which the displacement is to be measured.

As shown in FIG. 2, the E-shaped core can, if desired, be formed of two U-shaped cores 10 and 11 that are in contact along the length of their respective legs 12 and 13. FIG. 2 also shows that the short-circuiting ring member 14 can be arranged to encircle only the center leg, in this case the composite center leg 12, 13, being accordingly an apertured plate provided with a single aperture 15 through which the composite center leg 12, 13 passes. The short-circuiting ring member 14 is again freely movable back and forth in the direction of elongation of the core legs, as shown by the double arrow in the figure, and is again symbolically shown connected to a movable object 16.

The manner of operation of the transducers of FIG. 1 and FIG. 2 depends on the fact that the magnet winding 1, when excited with an alternating potential, generates a homogeneous alternating magnetic field between the legs 2, 8 and 9 in the one case and 10, 11, 12 and 13 in the other, the flux passing in each case through the yoke portion of the core 3 connecting the various legs. The short-circuiting ring member 4, or 14, as the case may be, provides a short-circuited turn, about each of the legs in the case of FIG. 1, and about the central composite leg in the case of FIG. 2, so that no alternating magnetic field can penetrate through the short-circuiting ring, as is illustrated by lines of force shown in the figures and identified by arrow heads corresponding to one polarity of magnet coil current. To a very good approximation, the total amount of magnetic flux thus produced is limited by the position of the short-circuiting ring to an amount proportional to the displacement of the ring along the length of the core legs. According to the induction law, the inductance of the magnet winding 1 is therefore caused to vary in proportion to the amount of displacement of the short-circuiting ring member along the length of the core.

The provision of the core 3 in accordance with the present invention in E shape has the advantage that the sensitivity of measurement provided by the inductive transducer is at least doubled compared to an inductive transducer with a movable short-circuiting ring having a U-shaped (two-legged) core. The very small mass of the short-circuiting ring member 4, 14 is also a great advantage that makes the inductive transducer of the present invention very suitable for dynamic measurements.

At high magnetic field alternating frequencies, upwards of about 100 kHz, the short-circuiting ring member may be no more than one or a few thin metal foils (preferably of copper or silver).

Dynamic measurements of displacement such as may be made with the transducer of the present invention are needed, for example, for air-flow quantity measurements in the intake duct of an internal combustion engine. A movable vane in the intake duct can be coupled with the short-circuiting ring of a transducer according to the invention, or the short-circuiting ring, in the form of an apertured plate, can itself be the air-flow sensitive vane. The deviation of the vane from its normal position produced by the air stream, against a restoring force, can then be a measure of the air quantity flowing by per unit of time.

The short-circuiting ring can also be connected with the membrane of a pressure-measuring chamber, in which case the very high sensitivity of the inductive transducer of the present invention makes it possible for very small changes in pressure to produce appreciable changes of the output signal of a circuit containing the inductive transducer. The output signal, as further described below in connection with FIG. 6, can at the choice of the instrument designer, be provided to an evaluation circuit either in digital or in analog signal form.

In order to keep the temperature dependence of the transducer which results from the temperature variation of conductivity of the short-circuiting ring 4, 14, as small as possible, the operating frequency of the alternating field can advantageously be chosen to be relatively high, for example 100 kHz. Furthermore, the increase of the ohmic resistance resulting from the so-called skin effect produced at higher alternating frequencies can be counter-acted or avoided in the case of the short-circuiting ring by the following means: making the aperture plate serving as the short-circuiting ring out of several layers of thin individual plates or metal foils, or producing the short-circuiting ring in the form of many turns of very thin wire.

Figure 3:
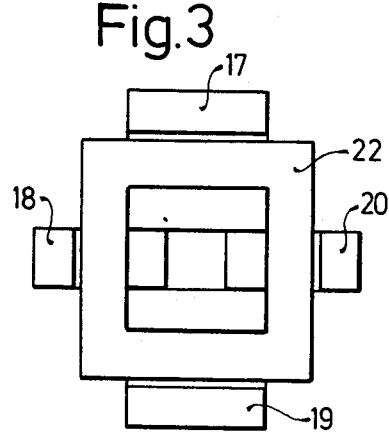
FIG. 3 is an end view.
Figure 4:
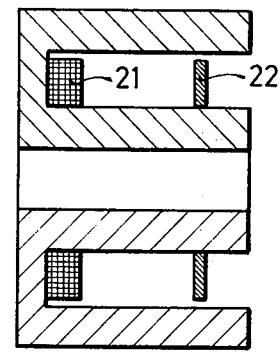
FIG. 4 is a longitudinal cross-section of a third embodiment of an inductive transducer in accordance with the invention.

A further improvment of the sensitivity of the inductive transducer can be provided by a multiple arrangement of U-shaped cores with a common magnet winding around the central cluster of core legs including one leg of each U-shaped core, as shown in FIGS. 3 and 4. As illustrated in these figures, four U-shaped cores 17, 18, 19 and 20, each spaced from the next around the short-circuiting ring 22 by substantially 90° are shown. The central cluster consisting of one leg of each of the U-shaped cores 17, 18, 19 and 20 is encircled both by the short-circuiting ring plate 22 and by the magnetic winding 21, the latter being located close to the yokes of the U-shaped cores. The core can also be formed with more than four U-shaped core elements.

Figure 5:
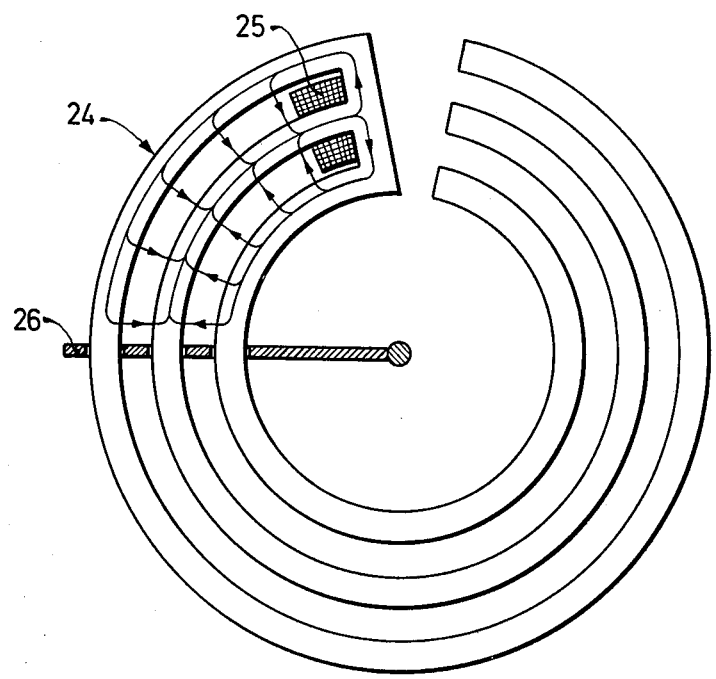
FIG. 5 is a diagrammatic plan view, partly in cross-section of a fourth embodiment of the invention suitable for use as an angular movement transducer.

The use of an inductive transducer according to the invention as an angular displacement transducer is illustrated in FIG. 5, where an E-shaped core 24 is shown having much elongated legs bent around in an arc of a circle, in this case forming an almost complete circle. The short-circuiting ring member 26, which is in the form of an aperture plate encircling each of these three legs, is in this case mounted on a rotary shaft 27 perpendicular to the center of the circular structure. The shaft 27 is connected to a body, not shown in the drawing, that is movable around the axis of the shaft 27, the amount of rotation of which about that axis is to be measured. Alternately, the shaft 27 could be connected by pulleys and belts, gears, or a linkage to the body movable about another axis in order to transmit angular displacement of the body with or without a step-up a step-down ratio, to the shaft 27 and hence to the short-circuiting ring 26.

Figure 8:
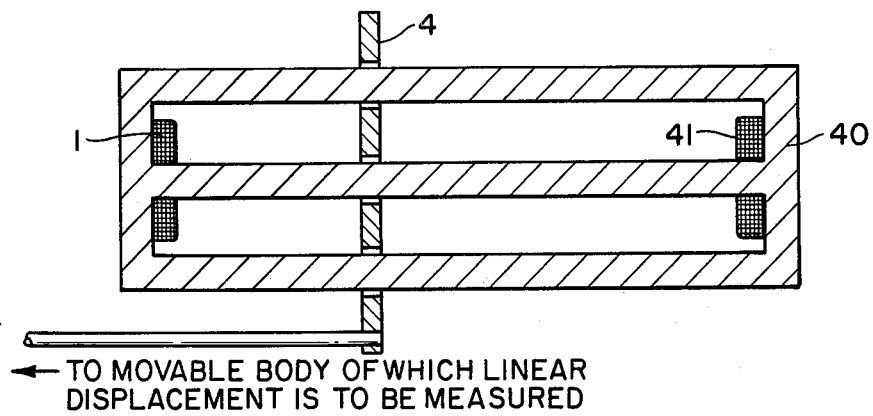
FIGS. 8 and 9 are diagrammatic representations, shown respectively in side view and in perspective, of differential types of inductive transducers in accordance with the invention corresponding respectively, in a general way, in FIG. 1 and to FIG. 5.
Figure 9:
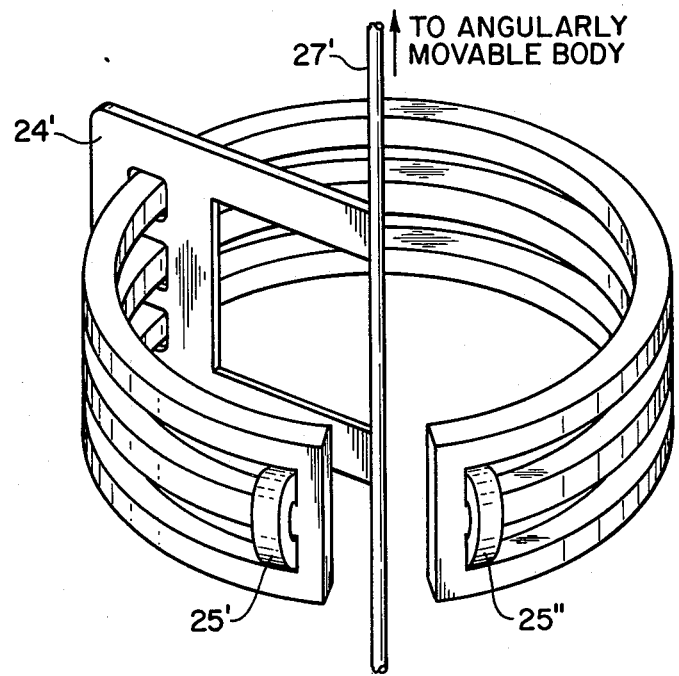

The inductive transducers of this invention can be provided in the form of differential displacement transducers or differential angular displacement transducers as shown respectively in FIGS. 8 and 9. FIG. 8 shows a transducer of the form shown in FIG. 1 in which the legs have been prolonged and terminated by a second yoke portion 40 adjacent to which a second winding 41 has been wound around the central elongated leg 2. Movement of the short-circuiting ring 4 affects in opposite ways the value of the inductance of the windings 1 and 41. The differential effect can be caused to produce a signal by putting the coils 1 and 41 in different arms of an inductance bridge, or each of the coils 1 and 41 may be used in a circuit such as the circuit of FIG. 6 and the differential effect obtained by comparing either the digital outputs 31 of the two respective circuits or the analog outputs 35 thereof.

FIG. 9 similarly shows a differential version of the transducer of FIG. 5, with the further modification that instead of utilizing concentric circularly bent core legs, coaxial circularly bent core legs joined by end yokes parallel to the axis of the structure are used. Movement of the short-circuiting ring 26' about the axis of the shaft 27' has a differential effect on the inductance of the two windings 25' and 25''.

The differential inductive transducers represented by the illustrative embodiments shown in FIGS. 8 and 9 have the advantage of providing a null position, which is to say a position when both magnet windings have the same inductance, that is independent of temperature and of aging effects. They also provide a doubling of the measurement sensitivity compared to the signal-ended devices illustrated in FIGS. 1-5, inclusive.

Figure 6:
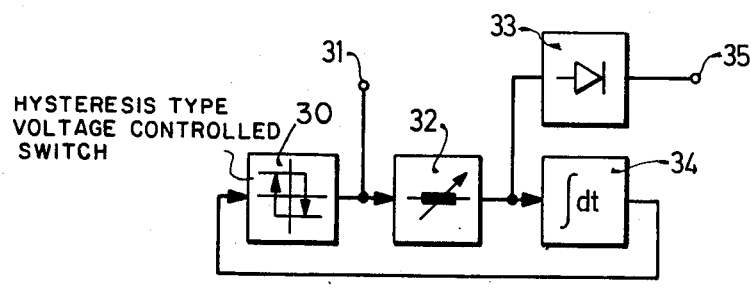
FIG. 6 is a block diagram of an electric circuit for utilization of an inductive transducer in accordance with the invention.
Figure 7:
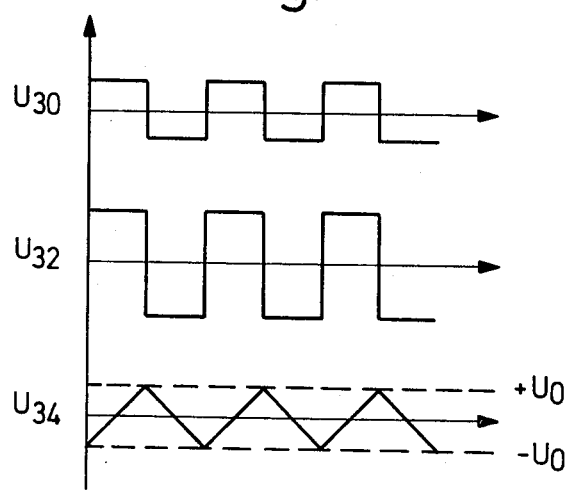
FIG. 7 is a wave form graph relating to the circuit shown in FIG. 6 for explanation of the latter.

FIG. 6 shows a circuit diagram in block form comprising an oscillator in which the frequency is dependent upon the magnitude of the inductance of a variable inductor according to the invention, the oscillator being composed of a comparator circuit 30 that is provided with hysteresis in its switching characteristic, which is to mean that it has an upper switching threshold $+U_0$ and a lower switching threshold $-U_0$ (these switching thresholds being shown in the lower portion of the graph of FIG. 7 which will presently be described after the circuit of FIG. 6 has been explained). The output of the comparator 30 is provided not only to the output terminal 31 of the oscillator, but is also fed back through a frequency determining variable inductance circuit 32 and then through an integrator 34. Although this circuit 32 may contain any type of variable inductor, the circuit of FIG. 6 is particularly well suited for use with a variable inductor embodying the present invention in the circuit 32, for example any one of the forms of inductors shown in FIGS. 1 to 5.

A preferred variable inductance circuit utilizing a variable inductor of the present invention is a circuit in which the variable inductor is preceded in series by an integrator and is provided with a secondary winding to form a built-in transformer, and in which a feedback resistance connects the output terminal of the inductor to the input of the integrator, as shown in FIG. 5 of my copending application Ser. No. 523,869, filed Nov. 14, 1974 now U.S. Pat. No. 3,973,191.

The terminal of the variable inductance circuit connected with the integrator 34 is also connected with a rectifying stage 33 which provides an analog voltage output to the analog output 35 of the oscillator. The output of the integrator state 34 is connected to the variable voltage input of the comparator 30 and is compared, as this variable voltage rises, with the upper switching threshold $+U_0$ and compared as the variable voltage decreases with the lower switching threshold $-U_0$.

The manner of operation of the circuit of FIG. 6 is illustrated with reference to the graphical diagram of FIG. 7. Let it first be assumed that a positive voltage is provided at the output of the comparator 30. This voltage is either increased or reduced in accordance with the value of inductance existing at the time in the variable inductance 32, and that value of inductance, when the inductance is an embodiment of the present invention in accordance with one of the FIGS. 1-5 of the annexed drawings, depends upon the position of the short-circuiting ring, which is to say upon the position of the body the displacement of which is being measured. The positive voltage at the other terminal of the variable inductor 32, which may be regarded as its output terminal, is integrated by the integrator 34. The higher the voltage at the output of the variable inductor 32 is, the faster the integration proceeds, which is to say, the faster is the voltage rise at the output of the integrator 34. As soon as the upper switching threshold voltage $+U_0$ of the comparator 30 is reached, the voltage at the output of the comparator jumps to a negative value. The voltage at the output terminal of the variable inductor 32 correspondingly changes, with the collapse of the previous magnetic field and the growth of a magnetic field in the opposite direction, the amplitude of the voltage spring depending upon the value of inductance at the moment. At the output of the integrator 34 there is now a decreasing or negative-going voltage, which continues to go negative until the lower switching threshold $-U_0$ of the comparator 30 is reached. The output of the compartor 30 then jumps back to a positive value of voltage, and again the value of voltage to which the other terminal of the variable inductor jumps dpends upon the value of the inductance at the moment. The magnitude of the voltage at the output of the variable inductor 32 is accordingly a measure for the rise time and for the fall-off time of the integrator output voltage, and is consequently likewise a measure for the frequency of the oscillator. The voltage at the output of the variable inductor 32 is rectified by the rectifier stage 33 so as to produce a d-c voltage signal at the analog output 35 of the oscillator that is proportional to the variable inductance and hence also proportional to the displacement to be measured. The displacement to be measured can thus be indicated either by a digital output signal when the square wave output at the terminal 31, which can be counted per unit of time and represented, for example, by a binary number produced by a binary encoder) or by an analog output signal, the output just described that appears at the analog output terminal 35. The electronic circuit of FIG. 6 can readily be made with operational amplifiers, as it is well known how to use an operational amplifier as an integrator and likewise how to use an operational amplifier as a comparator, with or without hysteresis, so that the entire circuit can be produced as an integrator circuit unit.

Athough the invention has been described with reference to particular illustrative examples, it is evident that variations may be made within the inventive concept and, in particular, that features shown in connection with one or more of the figures can be applied to or adapted to other figures, for instance.

I claim:

1. An inductive transducer for converting a mechanical movement into an electrical signal having a predetermined dependence on the movement of a body, comprising:
   a ferromagnetic core having at least three elongated portions elongated in the same direction and separated from each other by air gaps that are likewise elongated in the same direction as said elongated core portions, one of said elongated portions being centrally located among said elongated core portions, and a yoke portion joining said elongated portions;
   a short-circuiting member of conducting material encircling only that one of said elongated portions of said core which is centrally located among said elongated core portions and passing through the air gaps between said centrally located elongated portion and the other elongated core portions, said short-circuiting ring member being movable with respect thereto in the same direction of elongation of said core, and being thin with respect to its physical dimension in the direction of elongation of said core portions, said short-circuiting ring member being mechanically connected with a movable body that is movable in a direction corresponding to the mobility of said short-circuiting member with respect to said core, and
   a magnetic winding adjacent said yoke portion of said core and encircling said centrally located elongated portion of said core in such a manner as to couple with magnetic flux passing through said yoke portion of said core,
   whereby the inductance of said magnet winding is variable in accordance with a predetermined relation to the displacement of said body.

2. An inductive transducer as defined in claim 1 in which said core is an E-shaped core (3, 24).

3. An inductive transducer as defined in claim 2 in which said E-shaped core (3) is formed compositely by two U-shaped cores (10, 11) mutually in contact along respective longitudinal surfaces of one leg (12, 13) of each of said U-shaped cores (10, 11).

4. An inductive transducer as defined in claim 1 in which said core is a composite core including four U-shaped cores (17, 18, 19, 20) in such a way that one leg of each of said cores is a member of a single central cluster of legs and the U-shape of each of the adjacent U-shaped cores.

* * * * *

UNITED STATES PATENT AND TRADEMARK OFFICE
CERTIFICATE OF CORRECTION

PATENT NO. : 4,132,980
DATED : January 2, 1979
INVENTOR(S) : ERICH ZABLER

It is certified that error appears in the above–identified patent and that said Letters Patent are hereby corrected as shown below:

In claim 4 (column 8, line 28):

after "of each" insert

--core is oriented at right angles to the
      U-shape of each--.

Signed and Sealed this

Third Day of July 1979

[SEAL]

Attest:

Attesting Officer

LUTRELLE F. PARKER
Acting Commissioner of Patents and Trademarks